July 14, 1942.　　　　B. L. TAYLOR　　　　2,289,467
STEREOSCOPE
Filed July 11, 1940
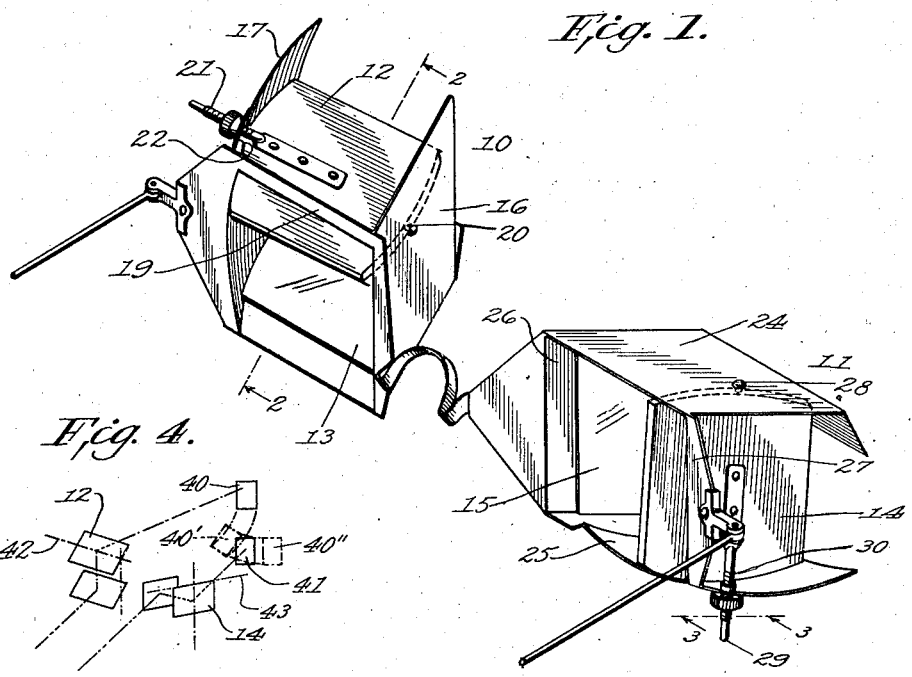
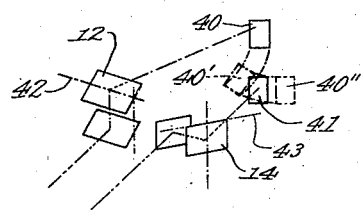
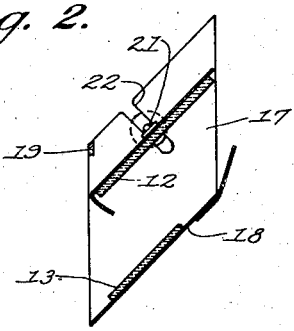
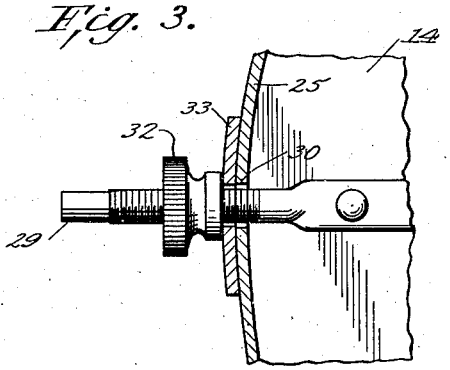
Inventor
Barney L. Taylor.
By Cushman, Darby & Cushman
Attorneys Patented July 14, 1942

2,289,467

UNITED STATES PATENT OFFICE 2,289,467

STEREOSCOPE

Barney Louis Taylor, Washington, D. C.

Application July 11, 1940, Serial No. 344,969

1 Claim. (Cl. 88—29)

This invention relates to a stereoscopic device and more particularly is directed to such a device having two mirror systems adapted to view a pair of stereoscopic pictures.

It is a particular object of this invention to provide a stereoscope through which the pictures may be viewed from any angle and it is especially designed to provide means for permitting the reflected image of each picture to be superimposed to produce the third dimensional effect, even though the pictures are viewed from an angle.

In the drawing:

Figure 1 is a perspective view of the stereoscopic device showing the two mirror systems, Figure 2 is a detailed sectional view of the object mirror adjusting means, taken on line 2—2 of Figure 1, Figure 3 is a detailed sectional view of the adjusting pin taken on line 3—3 of Figure 1, Figure 4 is an elemental diagram of the mirror systems and the manner in which they function to cause the reflected images to be superimposed.

Referring to Figure 1, the mirror systems are shown as including a vertically arranged system 10 and a horizontally disposed system 11. The vertical system includes an object mirror 12 to receive the light rays coming from one of the pictures placed before the stereoscope and an eye piece mirror 13 to receive the light rays reflected from mirror 12 and project them into the eye of the person using the device. The other mirror system 11 includes an object mirror 14 to receive light rays coming from the other picture and an eye piece mirror 15 to reflect the light rays coming from mirror 14 into the other eye of the person.

The vertical system 10 is supported in a frame having an inner side wall 16 and an outer curved side wall 17. The eye piece mirror 13 is fixedly mounted between walls 16 and 17 and is preferably integrally secured to the bottom wall 18 of the frame. The side walls 16 and 17 are connected at the top by a front frame member 19 to form a substantially rigid structure. The object mirror 12 is pivotally mounted by pin 20 in the inner wall 16 and on its outer end has an adjusting screw 21 which slides in a slot 22 as best shown in Figure 2. The object mirror 12 has both of its ends cut to a curvature which will permit the mirror to be adjustable in two planes about pin 20. It is evident that the mirror may be rotated about a broadly horizontal axis through pins 20 and 21 and it may also be adjusted by swinging said axis more or less vertically through slot 21, the opposite end of the axis remaining stationary and pivoting about pin 20.

The horizontal mirror system 11 is constructed like the vertical system 10 and has a top wall 24 and a curved bottom wall 25. The eye piece mirror 15 is fixedly mounted to the inner side wall member 26 and the top and bottom walls 24 and 25 are rigidly connected on the outer side by frame element 27. The object mirror 14 is pivotally mounted in the wall 24 by means of pin 28 and this mirror has a threaded adjusting pin 29 slidably mounted in a slot 30. The object mirror 14 has its ends curved to permit of adjustment in two planes also about pin 28.

The threaded adjusting pin on each of the object mirrors 12 and 14 is illustrated, typically, in Figure 3 where the threaded pin 29 is shown mounted on object mirror 14 so as to extend through the slot 30 in wall 25. The pin carries a knurled adjusting nut 32 as shown in Figure 3 which confines a friction washer 33 against the wall 25 to bind mirror 14 in the desired adjusted position as will appear more fully below.

Each of the walls 17 and 25 is spherical on a radius about the pivot points 20 and 28 respectively and the edges of the object mirrors cooperating with these walls have the same curvature, and form arcs with the pivot points as centers. The opposite edges of the object mirrors are relieved in any appropriate manner so they will not bind against the inner and top walls respectively in any position to which these mirrors may be moved.

The universal adjustability of the mirror systems above described has been provided to overcome an optical defect that has been encountered in previous devices of this type when the pictures to be viewed are seen from an angle. Referring to Figure 4, this optical defect and the manner in which it is corrected, will be explained.

In this figure the stereoscopic pictures 40 and 41 are arranged vertically and it is to be assumed that the person using the stereoscope is viewing the pictures from an angle to the left of the pictures. If the conventional type of mirror system were used, the object mirror 12, for example, would be adjustable about a horizontal axis 42 only, to cause the reflected image of picture 40 to move downwardly to merge with the reflected image of picture 41, seen through the other mirror system. It has been found, however, that when such an adjustment of the object mirror 12 is made, while viewing the pictures from a side angle, that the reflected image in being moved downwardly, is rotated from a true vertical position and is also deflected laterally. This displaced reflected image, seen by the left eye of the person, appears rotated from the vertical as shown in the dotted line 40'. In transposing the reflected image of picture 41 by the other mirror system, using only a single plane adjustment, the same result is encountered. It is this rotation from the vertical that precludes the use of such conventional mirror type stereoscopes in practical applications except where the user may be positioned in a plane perpendicular to the plane in front of the pictures to be viewed. When the two stereoscopic pictures are viewed from the side angle through these prior art devices, and the reflected images are moved into what should be coincidence, due to the rotation from vertical, the reflected images will be crossed to such an extent that they cannot be merged to produce the third dimensional effect.

The conventional mirror system type of stereoscope having an object mirror adjustable in one plane only, cannot overcome this optical defect. The present optical system, however, includes a mirror system adjustable in two planes whereby the vertical rotation above described may be counteracted. In using the herein disclosed stereoscope, and while viewing the pictures from a side angle mirror 12 for example, is moved to bring the reflected image of picture 40 to the position shown in Figure 4, the reflected image 40' being then transposed laterally by adjusting mirror 12 in its other plane of adjustment. In moving the reflected image of picture 40 from 40' to 40" the image appears to travel through an arc and in so doing is rotated in an opposite direction to bring the reflected image to a vertical position. It is then necessary to bring the reflected image of picture 41 into optical coincidence with image 40". Under certain circumstances, this may be accomplished by merely transposing the image laterally into coincidence. However, it is usually necessary to both transpose the image of picture 41 and also rotate the bundle of rays coming from it to a vertical position as the ray passes through the system, and for this reason, the horizontal mirror system is also made adjustable in two planes. The rotation of the reflected images from a true vertical is thus overcome and the two reflected images may be perfectly superimposed to produce the desired third dimensional effect.

It is obvious of course, that as above explained, under certain relationships, that the reflected image of picture 41 need be moved only horizontally sideways to meet the reflected image 40' and this later reflected image while being transposed downwardly and sidewise, would have to be rotated to a true vertical position by adjustment of mirror 12 to permit an optical coincidence of the reflected images. It would also be possible with the device herein disclosed to cause the reflected image of picture 41 to move upwardly and be rotated to coincide with a horizontally displaced image of picture 40, or the two reflected images could be made to coincide laterally of and at any position between the vertically arranged pictures 40 and 41.

When viewing the pictures from an angle to the right the reflected images would appear to be displaced to the left of the pictures 40 and 41 and correction to overcome the rotation of the images would have to be made as above described.

The disclosed manner of constructing the device of the present invention is by way of example only, and is not intended to limit the invention. It is obvious that modifications thereof will appear to those skilled in the art, all of which are contemplated within the scope of the following claim.

I claim:

A device for viewing a pair of stereoscopic pictures comprising two mirror systems each adapted to view a separate picture respectively, one of said mirror systems serving to reflect a bundle of light rays coming from one of said pictures into an eye of a person, the other of said mirror systems serving to reflect another bundle of light rays coming from the other of said pictures into the other eye of the person, each of said systems being adjustable in two planes to transpose the reflected images and also cause partial rotation of the bundle of light rays coming from the respective picture before each of said systems, each of said systems including a frame to support an object mirror and an eye mirror, each of said object mirrors being pivotally mounted in one side of said frame and having a releasable engagement with the other side thereof, a pivotal mounting for each of said object mirrors said other side of said frame being spherical on a radius about said pivot point as a center, said object mirrors being thus adjustably mounted in said frames whereby said pictures may be viewed from any angle without distorting or changing the vertical and horizontal alignment of reflected images and by suitable adjustment said systems will cause the reflected images of said pictures to be superimposed to produce a third dimensional effect.

BARNEY LOUIS TAYLOR.